United States Patent
Karg et al.

(10) Patent No.: US 11,977,982 B2
(45) Date of Patent: May 7, 2024

(54) TRAINING OF OSCILLATORY NEURAL NETWORKS

(71) Applicant: International Business Machines Corporation, Armonk, NY (US)

(72) Inventors: Siegfried Friedrich Karg, Adliswil (CH); Elisabetta Corti, Adliswil (CH)

(73) Assignee: International Business Machines Corporation, Armonk, NY (US)

(*) Notice: Subject to any disclaimer, the term of this patent is extended or adjusted under 35 U.S.C. 154(b) by 884 days.

(21) Appl. No.: 16/919,367

(22) Filed: Jul. 2, 2020

(65) Prior Publication Data

US 2022/0004876 A1 Jan. 6, 2022

(51) Int. Cl.

| | |
|---|---|
| *G06N 3/08* | (2023.01) |
| *G06N 3/048* | (2023.01) |
| *G06N 3/049* | (2023.01) |
| *G06N 3/063* | (2023.01) |
| *G06N 3/084* | (2023.01) |

(52) U.S. Cl.
CPC ............ *G06N 3/084* (2013.01); *G06N 3/048* (2023.01); *G06N 3/049* (2013.01); *G06N 3/063* (2013.01)

(58) Field of Classification Search
CPC ........ G06N 3/084; G06N 3/049; G06N 3/063; G06N 3/048; G06N 3/06; G06N 3/061
See application file for complete search history.

(56) References Cited

U.S. PATENT DOCUMENTS

| | | | |
|---|---|---|---|
| 5,446,828 A | * | 8/1995 | Woodall ............... G06N 3/049 706/26 |
| 7,280,989 B1 | | 10/2007 | Hoppensteadt |
| 2016/0125288 A1 | | 5/2016 | Pileggi |

(Continued)

FOREIGN PATENT DOCUMENTS

| | | |
|---|---|---|
| CN | 109833061 A | 6/2019 |
| CN | 110188868 A | 8/2019 |
| RU | 2697947 C1 | 8/2019 |

OTHER PUBLICATIONS

Mohammed Mulla, "Cost, Activation, Loss Function ||Neural Network || Deep Learning. What are these?", Apr. 25, 2020, pp. 1-19. (URL: https://medium.com/@zeeshanmulla/cost-activation-loss-function-neural-network-deep-learning-what-are-these-91167825a4de) (Year: 2020).*

(Continued)

*Primary Examiner* — Paulinho E Smith
(74) *Attorney, Agent, or Firm* — Douglas M. Crockatt

(57) ABSTRACT

The network comprises at least one network layer in which a plurality of electronic oscillators, interconnected via programmable coupling elements storing respective network weights, generate oscillatory signals at time delays dependent on the input signal to propagate the input signal from an input to an output of that layer. The network is adapted to provide a network output signal dependent substantially linearly on phase of oscillatory signals in the last layer of the network. The method includes calculating a network error dependent on the output signal and a desired output for the training sample, and calculating updates for respective network weights by backpropagation of the error such that weight-updates for a network layer are dependent on a vector of time delays at the input to that layer and the calculated error at the output of that layer.

18 Claims, 5 Drawing Sheets

(56) References Cited

U.S. PATENT DOCUMENTS

| | | | |
|---|---|---|---|
| 2019/0122095 A1* | 4/2019 | Karg | G06V 10/82 |
| 2021/0036665 A1* | 2/2021 | Mallinson | H03K 17/94 |
| 2021/0365819 A1* | 11/2021 | Hekmatshoartabari | G06V 10/94 |

OTHER PUBLICATIONS

Doya et al., "Adaptive Neural Oscillator Using Continuous-time Back-propagation Learning", Neural Networks, vol. 2, Issue 5, Jan. 18, 1989, 11 pgs.

Jackson et al., "Implementing Delay Insensitive Oscillatory Neural Networks Using CMOS and Emerging Technology", Analog Integr Circ Sig Process (2016) 89, pp. 619-629, DOI 10.1007/s10470-016-0803-4.

Jackson, Thomas C. et al., "An RRAM-based Oscillatory Neural Network", IEEE 2015 6th Latin American Symposium on Circuits & Systems (LASCAS), Montevideo, 2015, pp. 1-4, DOI: 10.1109/LASCAS.2015.7250481.

* cited by examiner

TRAINING OF OSCILLATORY NEURAL NETWORKS

BACKGROUND

The present invention relates generally to training of oscillatory neural networks. Methods are provided for training an oscillatory neural network, together with neural network systems implementing such methods.

Oscillatory neural networks (ONNs) are artificial neural networks which employ a network of coupled oscillators. The oscillators correspond to neurons of a neural network, and the strength of the coupling between pairs of oscillators emulates the network (synaptic) weights. Such networks can be trained to perform correlation tasks, such as image classification and speech recognition, by processing training samples in the network and adapting the matrix of network weights so that the network "learns", or memorizes, the particular correlations to be detected. Few hardware implementations have been proposed for ONNs, and these networks typically rely on mathematical pre-training of the weights matrix, e.g. via a Hebbian learning algorithm.

SUMMARY

One aspect of the present invention provides a neural network training method. The method includes encoding data defining a training sample as a vector of time delays in a network input signal, and supplying the input signal to an oscillatory neural network. The network comprises at least one network layer in which a plurality of electronic oscillators, interconnected via programmable coupling elements storing respective network weights, generate oscillatory signals at time delays dependent on the input signal to propagate the input signal from an input to an output of that layer. The network is adapted to provide a network output signal dependent substantially linearly on phase of oscillatory signals in the last layer of the network. The method includes calculating a network error dependent on the output signal and a desired output for the training sample, and calculating updates for respective network weights by backpropagation of the error such that weight-updates for a network layer are dependent on a vector of time delays at the input to that layer and the calculated error at the output of that layer. The method further comprises programming the coupling elements to update the stored weights in accordance with the calculated weight-updates.

A further aspect of the invention provides a neural network system comprising an encoder, an oscillatory neural network as described above, and a system controller. The encoder is adapted to encode data defining a training sample as a vector of time delays in a network input signal. The oscillatory neural network receives and propagates the input signal, and provides the network output signal as described above. The system controller is adapted to calculate the network error and weight-updates, and to program the coupling elements of the network, as described above.

An additional aspect of the invention provides a computer program product comprising a computer readable storage medium embodying program instructions, executable by a processing apparatus, to cause the processing apparatus to implement a neural network training method described above.

Embodiments of the invention will be described in more detail below, by way of illustrative and non-limiting example, with reference to the accompanying drawings.

DETAILED DESCRIPTION

Figure 1:
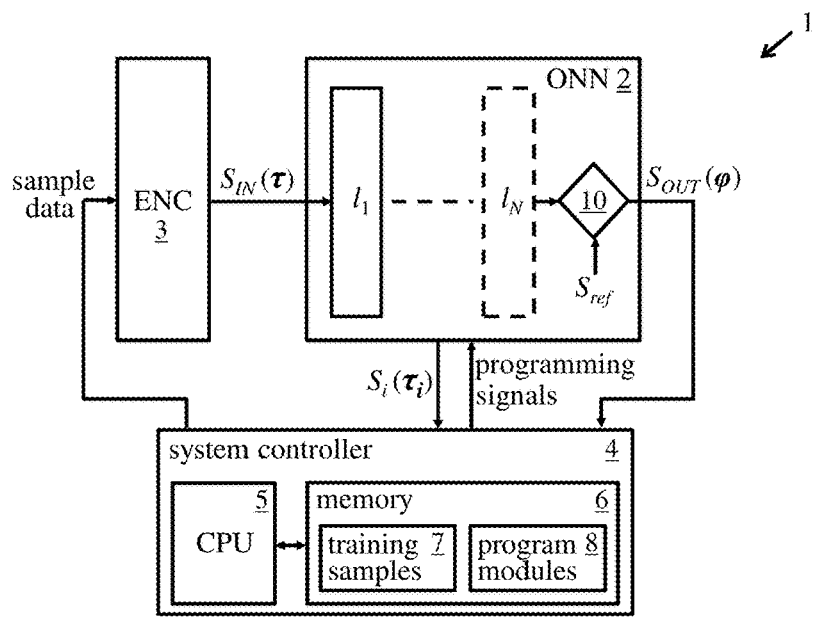
FIG. 1 is a schematic representation of a neural network system embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic block diagram of a neural network system embodying the invention. The system 1 comprises an ONN 2, an input encoder (ENC) 3, and a system controller 4. The ONN 2 comprises at least one network layer $l_i$, i=1, 2, . . . , N, (N≥1), via which a network input signal is propagated through the network. The system controller 4 is shown here comprising a central processing unit (CPU) 5 and memory 6. Memory 6 stores a set of training samples 7 for the ONN, and one or more program modules 8. Program modules 8 comprise program instructions executable by CPU 5 to implement functional steps of operations described below.

In operation of system 1, the encoder 3 receives data defining a training sample from controller 4, and encodes the sample data as a vector of time delays z in a network input signal. The resulting input signal $S_{IN}(\tau)$ is supplied to ONN 2. Each layer $l_i$ of ONN 2 comprises a plurality of electronic oscillators, interconnected via programmable coupling elements, which generate oscillatory signals at time delays dependent on the input signal. An example of the network layer structure is illustrated schematically in FIG. 2 which shows structure of the first network layer $l_1$. This layer comprises a number n of oscillators $O_1, \ldots, O_n$ corresponding to the number of time-delay elements in the vector $\tau$. Each oscillator $O_{j=1 \ to \ n}$ receives a component $s_j(t_j)$ of the input signal $S_{IN}(\tau)$ encoding a vector element $t_j$. This example shows a fully-connected ONN 2 layer in which each oscillator is coupled to each other oscillator via a programmable coupling element 9. The strength of this coupling is adjustable by programming of individual elements 9, and these coupling strengths correspond to respective network weights w. The connectivity shown corresponds to a triangular weights matrix W, with zeros along the diagonal, as indicated at the bottom of the figure.

The oscillators $O_1, \ldots, O_n$ in layer $l_1$ generate oscillatory signals $o_1, \ldots, o_n$ at time delays dependent on the input signal $S_{IN}(\tau)$ and the weights matrix W for the layer. For a multi-layer network (N>1), these oscillatory signals are relayed (after further processing detailed below) to the next network layer, providing an input signal $S_2(\tau_2)$ to that layer, and so on through the network. The input signal $S_{IN}(\tau)$ is thus propagated from an input to an output of each layer over successive layers of the network, with each layer $l_i$ receiving an input signal $S_i(\tau_i)$ from the previous layer.

The ONN 2 is adapted to provide a network output signal which is dependent substantially linearly on phase of oscillatory signals in the last layer $l_N$ of the network. In the FIG. 1 implementation, a phase detector 10 detects phase difference φ between oscillatory signals in the last layer and a reference signal $S_{ref}$ to generate the network output signal $S_{OUT}(φ)$. This output signal encodes a vector φ of the phase-differences φ measured by phase detector 10. The network output signal $S_{OUT}(φ)$ is used to calculate updates to the network weights w as detailed further below.

Figure 3:
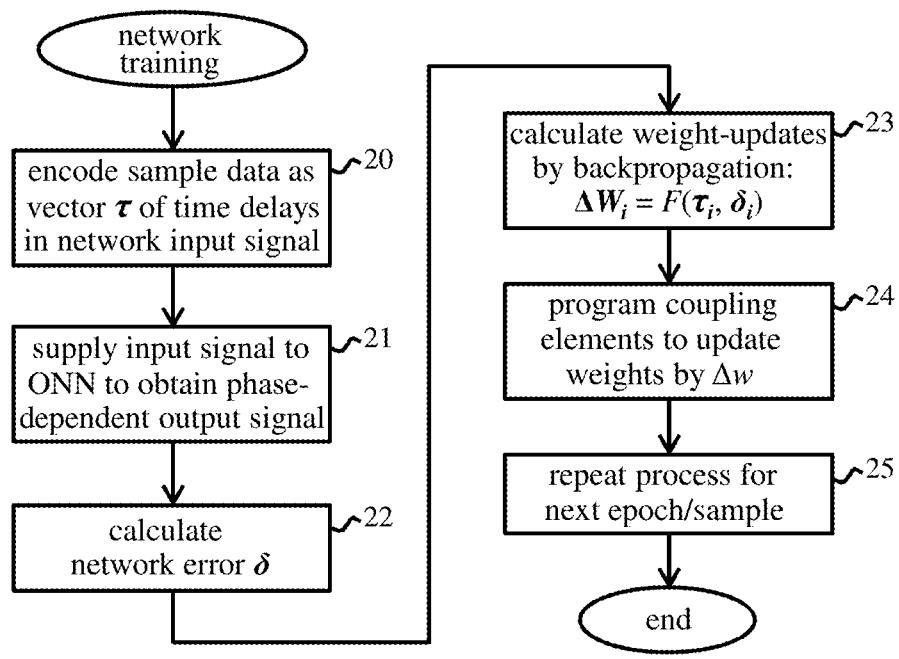
FIG. 3 indicates steps of a neural network training method performed by the FIG. 1 system.

FIG. 3 indicates steps of the training method performed in system 1. In step 20, encoder 3 generates the network input signal $S_{IN}(\tau)$ for a training sample supplied by controller 4. An example of this encoding process is described below. In step 21, the input signal $S_{IN}(\tau)$ is supplied to ONN 2 to obtain the network output signal $S_{OUT}(φ)$. As indicated in FIG. 1, controller 4 also receives the input signals $S_i(\tau_i)$ to each network layer $l_i$, with $S_i(\tau_i)$ being the network input $S_{IN}(\tau)$, for use in subsequent processing. In step 22, controller 4 calculates a network error, denoted by δ, which is dependent on the output signal $S_{OUT}(φ)$ and a desired output for the training sample. This desired output corresponds to an output that should be obtained for the input training sample in the fully-trained network. Each training sample in set 7 can be classified according to the particular correlation to be detected from that sample in the trained network, whereby different classifications, or "labels", assigned to samples are associated with respective desired outputs. In an image processing application, for example, labels may be assigned according to content of the training images and desired network outputs for different labels defined accordingly.

After calculating the network error in step 22, in step 23 the controller calculates weight-updates Δw for individual network weights w in each layer of the network. Since the network output $S_{OUT}(φ)$ depends substantially linearly on phase of signals produced from the time-delay encoded input sample, these weight-updates can be calculated by backpropagation in a particularly efficient manner Backpropagation provides a process for computation of an error corresponding to the output of each network layer, working iteratively back through the network layers from last to first, starting with the network error computed from the network output signal. Updates to the weights in each network layer can then be based on the calculated error at the output of that layer. The goal of backpropagation is to adjust each weight in the network in proportion to how much it contributes to reducing the overall error in the network. With the present system, weight-updates for each layer $l_i$ of ONN 2 can be simply and efficiently calculated as a function (denoted here by F) of a vector of time delays $\tau_i$ in the propagated signal $S_i(\tau_i)$ at the input to that layer and the calculated error $δ_i$ at the output of that layer. The matrix $ΔW_i = F(\tau_i, δ_i)$ of weight-updates Δw for each ONN layer is calculated by controller 4 in step 23. In step 24, controller 4 supplies programming signals to ONN 2 to program the coupling elements, whereby the stored weights are updated in accordance with the respective weight-updates Δw.

The process of steps 20 to 24 may correspond to one epoch of an iterative training process in which a given training sample is supplied to ONN 2 multiple times, e.g. until the network error is reduced below a threshold level, or no further improvement is achieved. The process may then be repeated for each training sample, whereby the training process iterates, as indicated at step 25, until all samples have been processed and/or a convergence condition (e.g. a desired performance level) is achieved.

The above embodiment provides an ONN implementation in which the network weights can be trained online by iterative propagation of training samples. Although oscillatory signals in the network are described by an exponential dependence of voltage on phase and time, the network output is substantially linear in phase which in turn is a linear function of input time delays. This is exploited to allow weight-updates to be calculated by backpropagation in an exceptionally simple manner. The network error can be backpropagated, and the weight-updates efficiently calculated for progressive tuning of the network, allowing optimization of weights by the online training process. The system thus offers highly efficient ONN training as well significant improvement in performance of the trained network.

In systems embodying the invention, the dependence of network output signal $S_{OUT}(φ)$ on phase should be substantially linear, in the sense that dependence of $S_{OUT}(φ)$ on phase is linear to a first order approximation. In general, a greater degree of linearity leads to more accurate results, so the linear term is preferably the dominant term in the function $S_{OUT}(φ)$. If there are any higher order, non-linear terms then ideally these are small by comparison with the linear term, e.g. less than 5%, and more preferably 1%, of the magnitude of the linear term.

Figure 2:
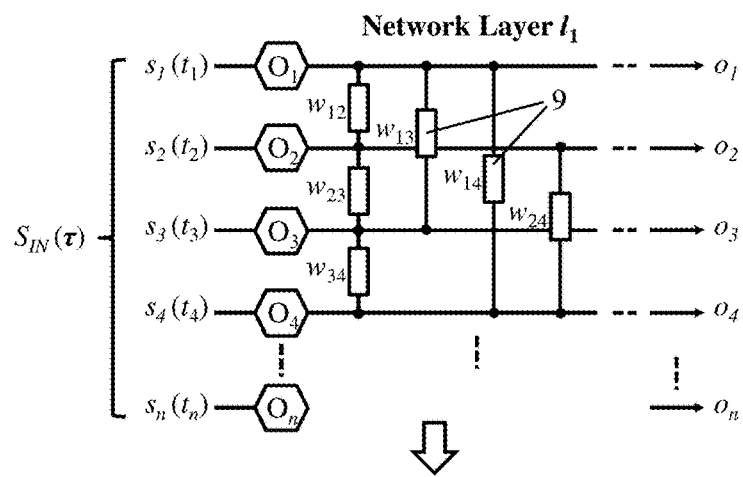
FIG. 2 illustrates coupling of oscillators in an exemplary network layer, and a corresponding weights matrix for the layer.

In general, any desired circuit implementation can be employed for the electronic oscillators O. Preferred embodiments employ relaxation oscillator circuits, and a particularly preferred implementation is detailed below. In a multilayer ONN 2, different network layers h may include different numbers of oscillators, with the number of oscillators typically reducing over successive layers of the network. The network may also include additional processing stages, e.g. pooling and activation stages, as explained further below. While a fully-connected network layer is shown in FIG. 2, a given oscillator may be coupled via elements 9 to one or more other oscillators in the layer.

The coupling elements 9, which provide the synaptic connections in the network, can be implemented in generally known manner using a variety of programmable memory circuits. Various synapse implementations are known based on the memristive properties of resistive memory devices such as PCM (phase-change memory) cells. Such devices are non-volatile memory devices which can be programmed to different internal states, exhibiting different electrical resistance, by application of current or voltage signals to the device. Coupling elements 9 may comprise any type of memristive device based, for example, on PCM cells or other resistive memory cells such as resistive RAM (RRAM) cells, including conductive bridge RRAM cells, oxide or metal-oxide RRAM cells, carbon RRAM cells, magneto-resistive random access memory (MRAM) elements and ferroelectric random access memory (FeRAM) elements, as well as circuit devices, e.g. CMOS circuits, comprising transistors, resistors, capacitors, and/or inductors, implementing programmable memory devices.

In some implementations, system controller 4 may be integrated with ONN 2 in a system-on-chip design. In other implementations the system controller may be implemented by a host computer operatively coupled to ONN 2. Control functions may be performed wholly by a host computer, or control functionality may be implemented by a host processor in communication with control apparatus, integrated with ONN 2, which performs local control operations, e.g. programming of network weights, in response to control signals from the host. In general, controller 4 may be implemented by one or more (general- or special-purpose) computers/programmable data processing apparatus, and functional steps of processing operations performed by the controller may be implemented by hardware or software or a combination thereof. Memory 6 may comprise one or more data storage entities, and may comprise main memory, e.g. DRAM (dynamic random access memory) and/or other storage which is physically separated from CPU 5, as well as cache and/or other memory local to CPU 5.

Figure 4:
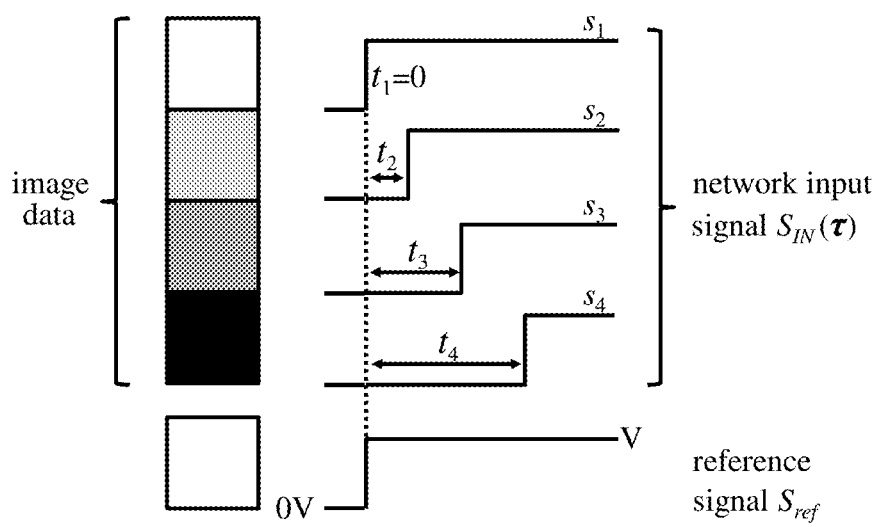
FIG. 4 illustrates operation of an encoder in an embodiment of the system.

Preferred implementations of system 1 are described in more detail below. FIG. 4 illustrates operation of encoder 3 for an image processing application in which the input sample data defines pixels of a training image. Four pixels are shown in this simple example, with pixel values corresponding to a grey scale between white and black. Encoder 3 encodes the pixel values in a set of DC signals $s_1$ to $s_4$ which are switched from 0 volts to a voltage V at respective time delays $t_1$ to $t_4$ with respect to a reference signal $S_{ref}$. The magnitude of these time delays corresponds to the grey scale pixel value, e.g. between 0 (white) and 1 (black). In the example shown, signal $s_1$ corresponds to reference signal $S_{ref}$ whereby $t_1=0$. The time delays increase with pixel value up to a maximum time delay $t_4$ for the black pixel. The DC signals $s_1$ to $s_4$ constitute the network input signal $S_{IN}(\tau)$ encoding the time delay vector $\tau=(t_1, t_2, t_3, t_4)$. Any number of image pixels, or data points defining any type of training sample, can be encoded by this scheme.

Figure 5:
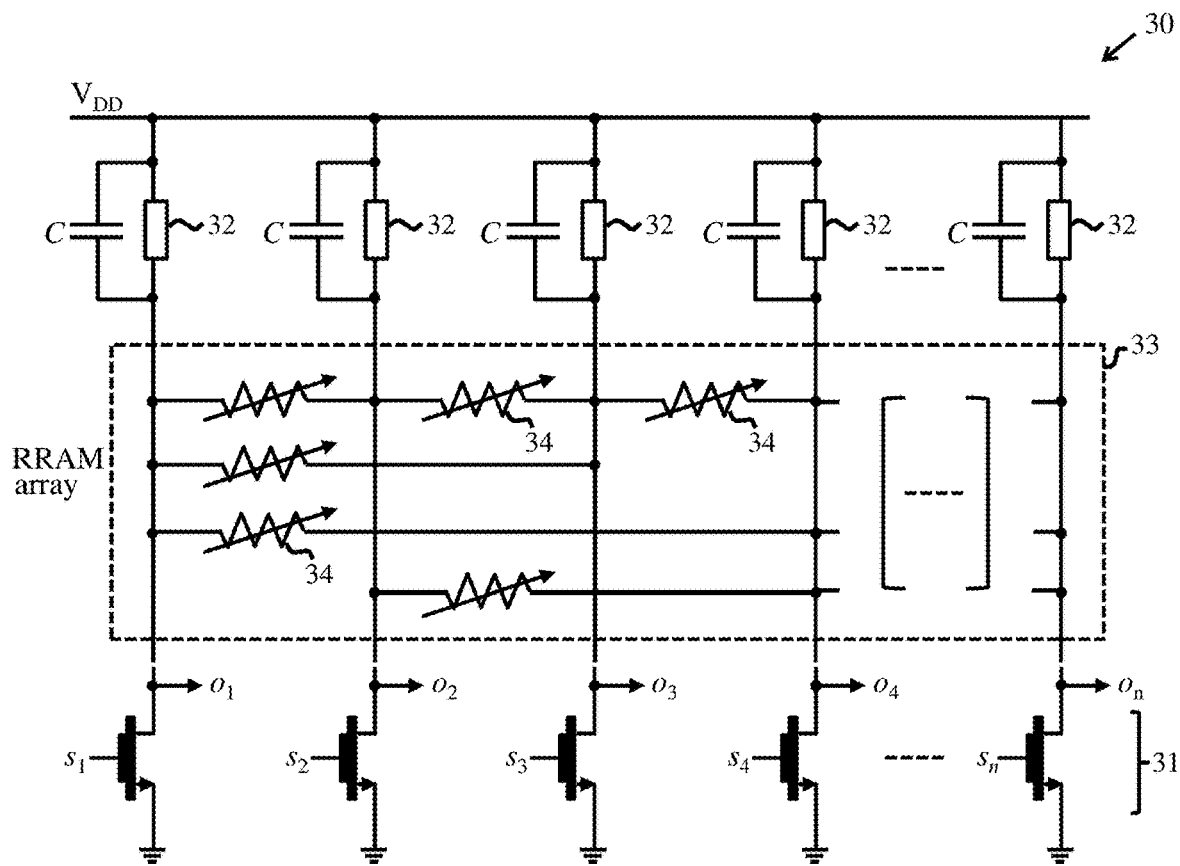
FIG. 5 illustrates more detailed construction of a network layer in a preferred embodiment.

FIG. 5 shows a particularly preferred implementation for a network layer $l_i$. This circuit 30 comprises n relaxation oscillators each comprising a field-effect transistor, here a MOSFET (Metal Oxide Semiconductor Field-Effect Transistor) 31. Each oscillator further comprises a capacitor C connected in parallel with a device with a negative differential resistance (NDR) 32. An NDR 32 can be implemented in various ways, with this embodiment using PCM switching elements based on $VO_2$ thin-film junctions. The oscillators are coupled via an array 33 of RRAM elements 34 generally as described with reference to FIG. 2. Dense arrays of these memristive elements 34 can be fabricated as integrated nanoscale systems using well-known material processing techniques.

Figure 6:
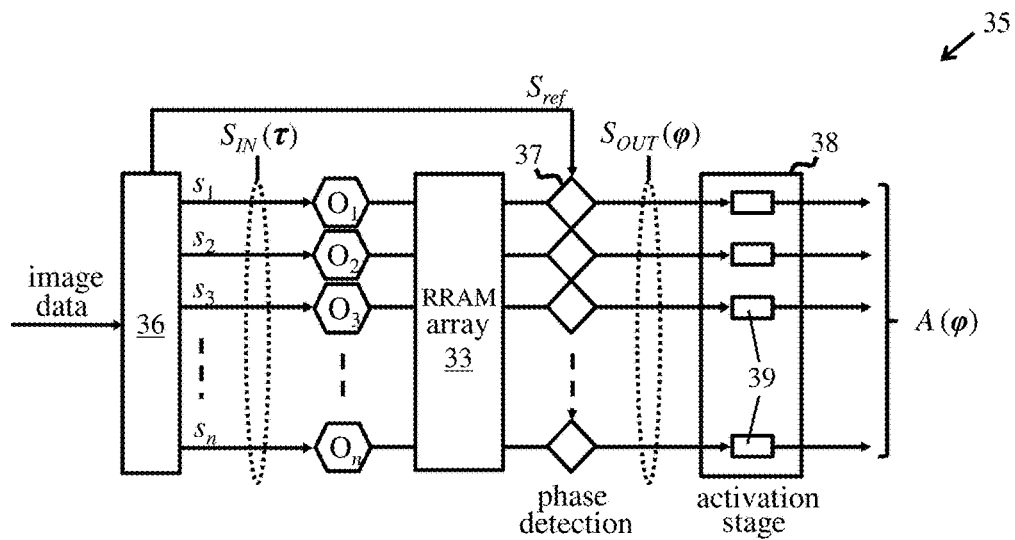
FIG. 6 illustrates structure of a single-layer network in an embodiment of the system.
Figure 7:
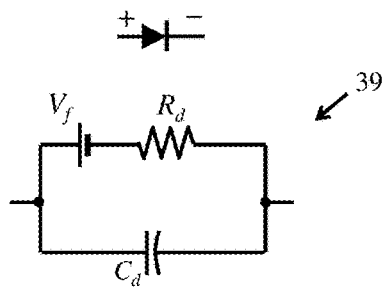
FIG. 7 illustrates structure of a non-linear element in the FIG. 6 embodiment.

The time delays encoded in the input signal $S_{IN}(\tau)$ determine timing of signals applied to the gate of respective transistors 31 in the first layer 30 of the ONN. The component signals $s_1, s_2, \ldots, s_n$ of $S_{IN}(\tau)$ can be applied directly to the gates of respective transistors 31 here, initiating generation of oscillatory signals $o_1, o_2, \ldots, o_n$. FIG. 6 illustrates structure of a single-layer ONN 35 using layer circuitry 30 in a preferred embodiment. The input encoder 36 encodes image data as described with reference to FIG. 4. The input signal $S_{IN}(\tau)$ is supplied to oscillators $O_1$ to $O_n$ coupled by RRAM matrix 33 of network layer 30. A phase detection stage 37 detects the vector φ of phase differences between signals $o_1, \ldots, o_n$ and the reference signal $S_{ref}$ to provide the output signal $S_{OUT}(\varphi)$. This is supplied to an activation stage 38 which applies a predetermined non-linear function to the output signal. Activation stage 38 is implemented in hardware here by a set of diodes 39 for applying a ReLU (Rectified Linear Unit) function to the output signal. Diodes 39 may be implemented, for example, by transistors, but are conveniently implemented by an equivalent circuit shown in FIG. 7, having resistance $R_d$ and capacitance $C_d$, with $V_f$ representing the forward bias voltage of the diode. The resulting signal $A_{(\varphi)}$ from activation stage 38 is supplied to controller 4 for further processing detailed below.

The vector φ of phase differences in ONN 35 depends on the input time delay vector and the network weights. For the image processing application of FIG. 4, the network can be trained such that a time delay $t_j=0$ (corresponding to a white pixel) in an input signal $s_j$ results in an oscillatory signal $o_j$ which (in the steady state) is in phase with reference signal $S_{ref}$. A time delay $t_j=t_4$ (corresponding to a black pixel) in an input signal $s_j$ results in an oscillatory signal $o_j$ with a phase difference of π (in the steady state) with respect to $S_{ref}$. Grey scale values may result in phase differences dependent on the particular correlation application. For example, if detection of only black-and-white images is required, grey scale values may result in a phase difference of 0, or of 0 or π depending on the pixel value relative to a defined threshold. If detection of grey scale images is required, grey scale values may result in phase differences on a scale between 0 and π.

Figure 8:
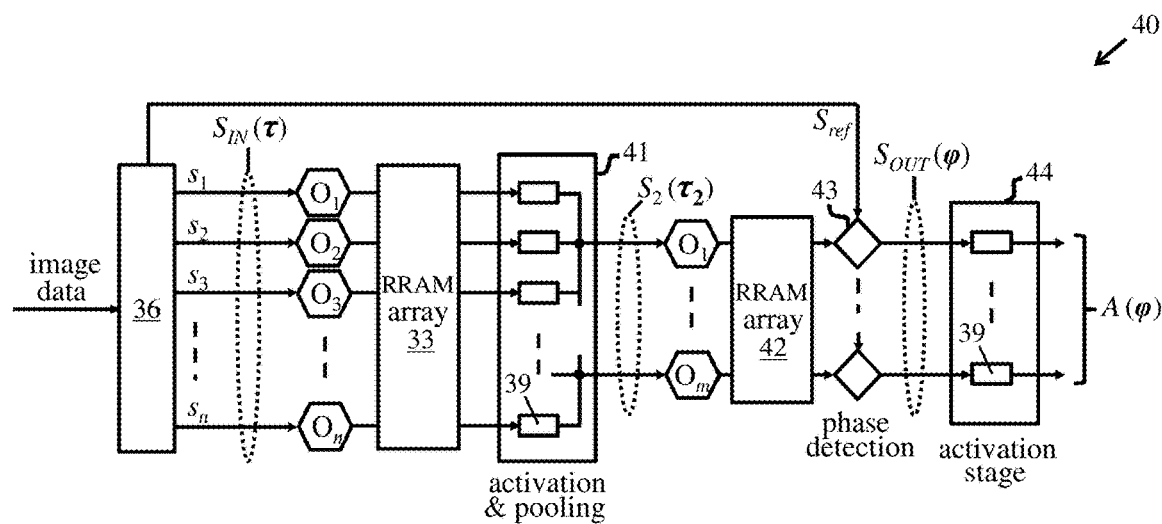
FIG. 8 illustrates structure of a two-layer network in an embodiment of the system.

FIG. 8 shows a two-layer ONN 40 based on layer circuitry 30, where like components in FIG. 6 are indicated by like references. Here, an activation stage 41, comprising diodes 39, is connected directly to the output of first network layer $l_1$. This stage also performs signal pooling by combining signal components into the required number m of signals for input to the next network layer. This layer comprises m oscillators $O_1$ to $O_m$, coupled by an RRAM matrix 42, with the general structure shown in FIG. 4. A phase detection stage 43 detects phase difference between the oscillatory signals $o_1, \ldots, o_m$ in this layer and the reference signal $S_{ref}$. The resulting signal $S_{OUT}(\varphi)$ is supplied to an activation stage 44, again implemented with diodes 39, to apply a ReLU function to the network output. The resulting signal $A_{(\varphi)}$ is supplied to controller 4 for further processing.

The structure shown in FIG. 8 can be readily extended to any desired number of network layers h. Initial values for the network weights can be selected in various ways, e.g. as randomly distributed values, or may be determined by mathematical pretraining of the weights offline, e.g. via Hebbian learning.

Figure 9:
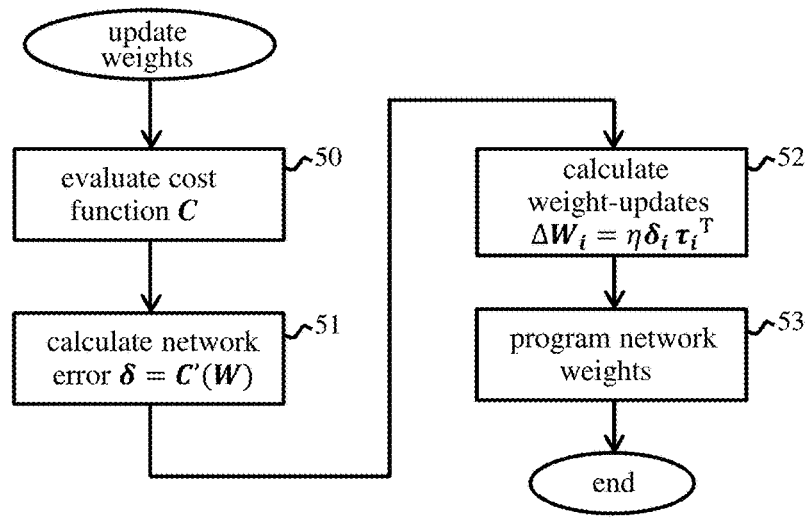
FIG. 9 indicates steps of a weight-update calculation in a preferred embodiment.

Although the oscillatory signals in ONNs 35, 40 are described by exponential dependencies of the form $$V \sim e^{\frac{t}{RC}+\varphi},$$

the signals at the output of a network layer $l_i$ depend linearly on phase according to $\varphi_i \propto (W_i \times \tau_i)$, where $W_i$ is the weights matrix for that layer and $\tau_i$ is the vector of time delays $\tau_i$ at the input to that layer. FIG. 9 indicates steps of the weight-update process performed by controller 4 in this embodiment. In step 50, the controller evaluates a cost function for the network where this cost function is dependent on difference between the desired output for the training sample and the non-linear function A(φ) of output signal. The cost function C in this embodiment is given by Equation 1.

$$C=(\hat{O}-O)^2/2, \quad \text{(Equation 1)}$$

where: O=A(φ) at the output of the last network layer, and Ô is the desired network output as described above. In step 51, the controller calculates the network error δ as the derivative C'(W) of the cost function Equation 2.

$$\delta=C'(W)=C'(A)\times A'(\varphi)\times\varphi'(W) \quad \text{(Equation 2)}$$

which gives Equation 3.

$$\delta=(\hat{O}-O)\times A'(\varphi)\times\tau_N. \quad \text{(Equation 3)}$$

For ReLU activation, A(φ)=max (0, φ), whereby A'(φ)=1 for φ>0, else A'(φ)=0. For the image processing application of FIG. 4, phase differences φ are given by 0≤φ≤π with any phase difference value, relative to $S_{ref}$, between π and 2π being detected as 360° minus that value to rescale into the range 0≤φ≤π.

The network error δ is backpropagated through the network to calculate the error $δ_i$ at the output of each preceding network layer. This can be calculated by controller 4 using the chain rule in the usual manner. The weight-updates ΔW for each network layer $l_i$ are then calculated in step 52. For the preferred embodiment described, the weight-update calculation simplifies to Equation 4.

$$\Delta W_i = \eta \delta_i \times (\tau_i)^T \text{ for } \varphi > 0, \quad \text{(Equation 4)}$$

where T denotes the vector transpose, and η is a learning parameter (typically 0<η<1) which can be set as desired for each layer. Multiplication of the column vector $\eta \delta_i$ by the row vector $(\tau_i)^T$ thus gives the matrix $\Delta W_i$ of weight-updates $\Delta w_i$ for layer $l_i$. In step 53, the controller updates each network weight in accordance with the corresponding entry in the matrix $\Delta W_i$ for each layer, and training continues to the next epoch.

The preferred embodiment above provides a highly efficient system for online training of a hardware ONN. The ONN can operate at extremely high-speed and with very low power consumption. The FIG. 5 layer structure provides finely-tuned control of the oscillatory circuits via application of input signals to the gates of FETs 31, giving highly-accurate timing control. This improves overall accuracy of the training process, offering high-speed training and enhanced performance of the trained network.

Figure 10:
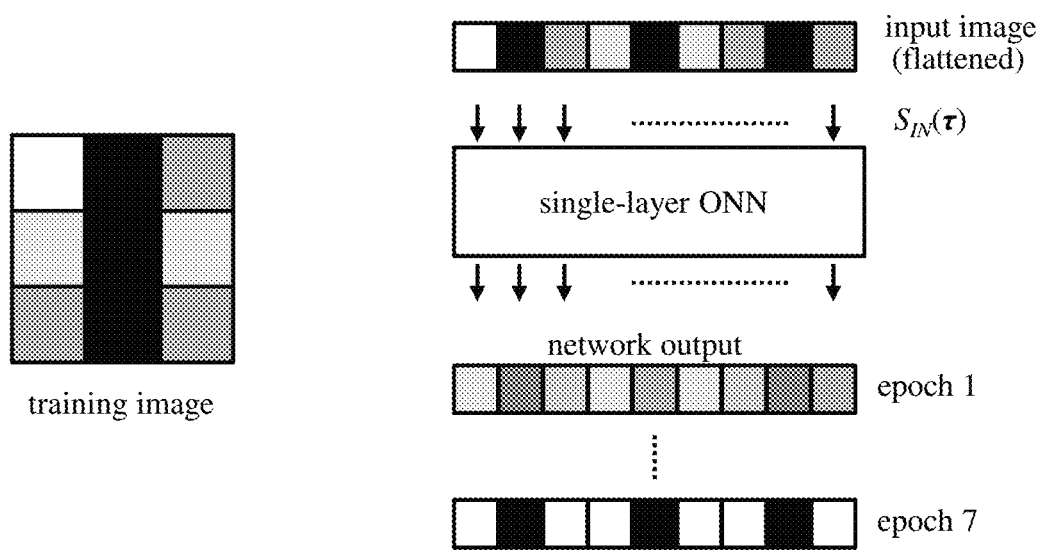
FIG. 10 illustrates learning of a black-and-white image with a low-contrast training sample in an embodiment of the invention.

FIG. 10 illustrates test results for a system embodying the invention using a single-layer ONN to learn a training pattern. A simple nine-pixel training image, shown on the left of the figure, was used for this test. The image pixels were applied to a single-layer ONN, with nine oscillators as described above, with the object of training the ONN to detect black-and-white images in spite of any grey-scale variations in the input. The selected training image thus represents a particularly difficult test due to the extent of grey-scale variation. The network output for the test is indicated by equivalent flattened images in the figure. After only seven training epochs, the network output matched the required black-and-white image.

Figure 11:
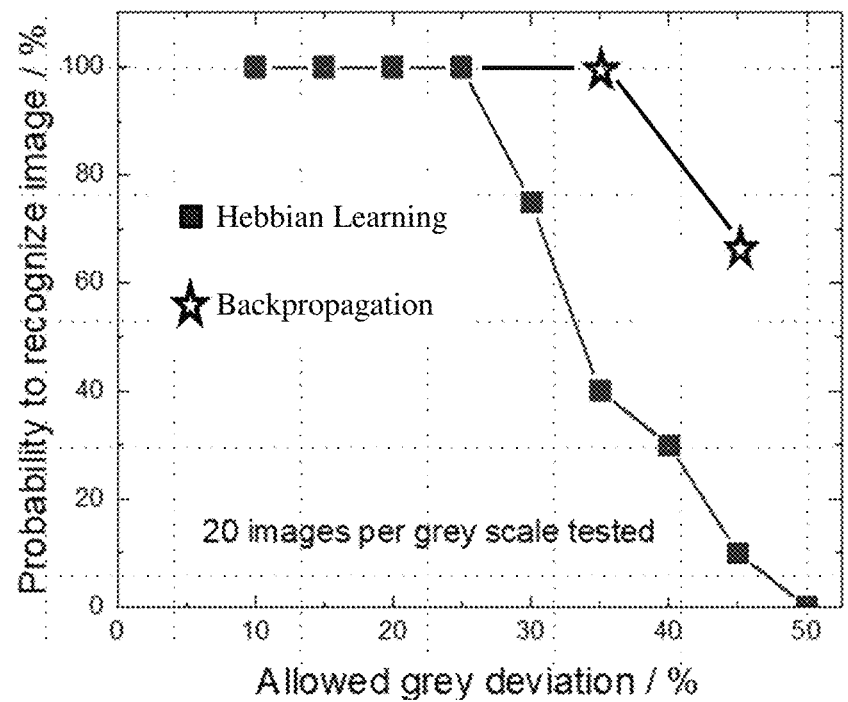
FIG. 11 compares system performance using a training method embodying the invention and a Hebbian learning algorithm.

When applied for inference operations after training, the trained network weights remain fixed. The network output in response to a (previously unseen) input image then indicates a label which maps to a particular type or category of image which the network has been trained to detect. ONNs trained by methods embodying the invention offer enhanced inference performance compared to prior training methods based on Hebbian learning. This is illustrated in FIG. 11 which compares inference results for ONNs trained to recognize black-and-white images by Hebbian learning and a backpropagation training scheme described above. The probability that the network correctly identifies the correct black-and-white version of an input image is plotted versus the allowed deviation in grey-scale of input images, up to 50% on the grey scale from white to black. Both training methods gave accurate results up to about 23% grey scale deviation. However, the method embodying the invention significantly outperformed Hebbian learning for the more-difficult tests at higher grey-scale deviations.

It will be appreciated that many changes and modifications can be made to the exemplary embodiments described. For example, while preferred hardware implementations are described above, activation stages may be implemented by software in controller 4 in other embodiments. Other activation functions, e.g. Sigmoid activation, may be used in some embodiments. Different cost functions may also be employed provided the derivative can be readily defined. Various modifications to the FIG. 5 oscillator circuitry may also be envisaged. For instance, the capacitors may be dropped across respective transistors 31 instead of NDRs 32.

In general, where features are described herein with reference to a method embodying the invention, corresponding features may be provided in a system/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for neural network training comprising:
    encoding, by one or more computer processors, data defining a training sample as a vector of time delays in a network input signal;
    supplying, by one or more computer processors, the input signal to an oscillatory neural network comprising at least one network layer in which a plurality of electronic oscillators each comprising a field-effect transistor and a capacitor connected in parallel with a device with a negative differential resistance, interconnected via programmable coupling elements storing respective network weights, generate oscillatory signals at time delays dependent on the input signal to propagate the input signal from an input to an output of that layer, the oscillatory neural network being adapted to provide a network output signal dependent linearly on phase of oscillatory signals in the last said layer of the oscillatory neural network;
    calculating, by one or more computer processors, a network error dependent on said output signal and a desired output for the training sample, wherein said network error comprises a derivative of a cost function dependent on said output signal and said desired output for the training sample;
    calculating, by one or more computer processors, updates for respective network weights by backpropagation of said error such that weight-updates for a network layer are dependent on a vector of time delays at the input to that layer and the calculated error at the output of that layer; and
    programming, by one or more computer processors, said coupling elements to update the stored weights in accordance with said weight-updates.

2. The computer-implemented method of claim 1, wherein said network output signal is dependent on phase difference between oscillatory signals in a last layer and a reference signal.

3. The computer-implemented method of claim 1, wherein said cost function is dependent on difference between said desired output for the training sample and a predetermined non-linear function of said output signal.

4. The computer-implemented method of claim 3, wherein said non-linear function comprises a ReLU function and wherein the network output signal is supplied to an activation stage, comprising a set of diodes, for applying the ReLU function to the network output signal.

5. The computer-implemented method of claim 1, wherein the oscillatory neural network comprises a plurality of layers.

6. The computer-implemented method of claim 5, wherein the output of each layer is connected to an activation stage for applying a predetermined non-linear function to an output signal of that layer.

7. The computer-implemented method of claim 6, wherein said non-linear function comprises a ReLU function and wherein said activation stage comprises a set of diodes.

8. The computer-implemented method of claim 1, wherein:
  each time delay encoded in the input signal determines timing of a signal applied to a gate of a said transistor in the first network layer to initiate generation of an oscillatory signal by that transistor.

9. A neural network system comprising:
  an encoder adapted to encode data defining a training sample as a vector of time delays in a network input signal;
  an oscillatory neural network for receiving the input signal, the network comprising at least one network layer in which a plurality of electronic oscillators each comprising a field-effect transistor and a capacitor connected in parallel with a device with a negative differential resistance, interconnected via programmable coupling elements storing respective network weights, generate oscillatory signals at time delays dependent on the input signal to propagate the input signal from an input to an output of that layer, the oscillatory neural network being adapted to provide a network output signal dependent linearly on phase of oscillatory signals in the last said layer of the oscillatory neural network;
  a system controller adapted to calculate a network error dependent on said output signal and a desired output for the training sample, wherein said network error comprises a derivative of a cost function dependent on difference between said desired output for the training sample and a predetermined non-linear function of said output signal, to calculate updates for respective network weights by backpropagation of said error such that weight-updates for a network layer are dependent on a vector of time delays at the input to that layer and the calculated error at the output of that layer, and to program said coupling elements to update the stored weights in accordance with said weight-updates.

10. The neural network system of claim 9, wherein said network output signal is dependent on phase difference between oscillatory signals in a last layer and a reference signal.

11. The neural network system of claim 9, wherein said non-linear function comprises a ReLU function and wherein the network output signal is supplied to an activation stage, comprising a set of diodes, for applying the ReLU function to the network output signal.

12. The neural network system of claim 9, wherein the oscillatory neural network comprises a plurality of layers.

13. The neural network system of claim 12, wherein the output of each layer is connected to an activation stage for applying a predetermined non-linear function to an output signal of that layer.

14. The neural network system of claim 13, wherein said non-linear function comprises a ReLU function and wherein said activation stage comprises a set of diodes.

15. The neural network system of claim 9, wherein the network is adapted such that each time delay encoded in the input signal determines timing of a signal applied to a gate of a said transistor in the first network layer to initiate generation of an oscillatory signal by that transistor.

16. The neural network system of claim 9, wherein the coupling elements comprise resistive memory devices.

17. The neural network system of claim 9, wherein each said oscillator comprises a relaxation oscillator.

18. A computer program product for training an oscillatory neural network, the computer program product comprising a computer readable storage medium having program instructions embodied therein, the program instructions being executable by a processing apparatus to cause the processing apparatus to:
  encode data defining a training sample as a vector of time delays in a network input signal;
  supply the input signal to an oscillatory neural network comprising at least one network layer in which a plurality of electronic oscillators each comprising a field-effect transistor and a capacitor connected in parallel with a device with a negative differential resistance, interconnected via programmable coupling elements storing respective network weights, generate oscillatory signals at time delays dependent on the input signal to propagate the input signal from an input to an output of that layer, the oscillatory neural network being adapted to provide a network output signal dependent linearly on phase of oscillatory signals in the last said layer of the oscillatory neural network;
  calculate a network error dependent on said output signal and a desired output for the training sample, wherein said network error comprises a derivative of a cost function dependent on said output signal and said desired output for the training sample;
  calculate updates for respective network weights by backpropagation of said error such that weight-updates for a network layer are dependent on a vector of time delays at the input to that layer and the calculated error at the output of that layer; and
  program said coupling elements to update the stored weights in accordance with said weight-updates.

\* \* \* \* \*